(12) United States Patent
Son et al.

(10) Patent No.: US 7,769,177 B2
(45) Date of Patent: Aug. 3, 2010

(54) METHOD FOR MANAGING DIGITAL RIGHTS IN BROADCAST/MULTICAST SERVICE

(75) Inventors: Sung-Mu Son, Gyeonggi-Do (KR); Te-Hyun Kim, Gyeonggi-Do (KR); Dong-Hee Shim, Seoul (KR); Kyu-Sung Han, Seoul (KR); Min-Jung Shon, Seoul (KR); Seung-Jae Lee, Gyeonggi-Do (KR); Youn-Sung Chu, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1203 days.

(21) Appl. No.: 11/331,097

(22) Filed: Jan. 13, 2006

(65) Prior Publication Data

US 2006/0206708 A1 Sep. 14, 2006

Related U.S. Application Data

(60) Provisional application No. 60/643,997, filed on Jan. 14, 2005.

(30) Foreign Application Priority Data

Apr. 9, 2005 (KR) .................. 10-2005-0029717

(51) Int. Cl.
*H04L 9/08* (2006.01)
(52) U.S. Cl. ............... 380/281; 713/163; 726/26; 726/27; 726/29
(58) Field of Classification Search ............ None
See application file for complete search history.

(56) References Cited

U.S. PATENT DOCUMENTS

| 6,594,758 B1* | 7/2003 | Okui ................ 713/163 |
| 2002/0104001 A1* | 8/2002 | Lotspiech et al. ....... 713/163 |
| 2002/0198845 A1 | 12/2002 | Lao et al. |
| 2003/0039361 A1* | 2/2003 | Hawkes et al. ........... 380/278 |
| 2003/0046539 A1* | 3/2003 | Negawa .................. 713/163 |
| 2003/0076955 A1 | 4/2003 | Alve et al. |

(Continued)

FOREIGN PATENT DOCUMENTS

KR 10-0095726 A 6/2005

(Continued)

OTHER PUBLICATIONS

Open Mobile Alliance, "DRM Specification V2.0-OMA-DRM-DRM-V2_0-20040420-D, Apr. 20, 2004," pp. 45-63, cited in the attached Chinese Office Action in Chinese Application No. 200680001183.2, dated Dec. 11, 2009.

(Continued)

*Primary Examiner*—Matthew B Smithers
*Assistant Examiner*—David J Pearson
(74) *Attorney, Agent, or Firm*—Birch, Stewart, Kolasch & Birch, LLP

(57) ABSTRACT

A method of digital rights management for a broadcast-multicast service, the method comprising receiving a request from a terminal to join a service domain having a common group key; transmitting encryption of one or more service encryption keys using the common group key to the terminal that requested to join; and allowing the terminal to share the same contents and the same services with one or more other devices within the service domain.

10 Claims, 8 Drawing Sheets

U.S. PATENT DOCUMENTS

2004/0101138 A1* 5/2004 Revital et al. ............... 380/210
2005/0172127 A1* 8/2005 Hartung et al. ............. 713/167
2006/0056324 A1* 3/2006 Hyyppa et al. ............. 370/310

FOREIGN PATENT DOCUMENTS

| RU | 2193291 C2 | 11/2002 |
|---|---|---|
| WO | WO-03/005145 A2 | 1/2003 |
| WO | WO-03/036441 A2 | 5/2003 |

OTHER PUBLICATIONS

Open Mobile Alliance: "DRM Specification V2.0 Draft Version 2.0—OMA-DRM-V2_0-20040420-D", Apr. 20, 2004, pp. 1-145, XP002418067.

* cited by examiner

FIG.9
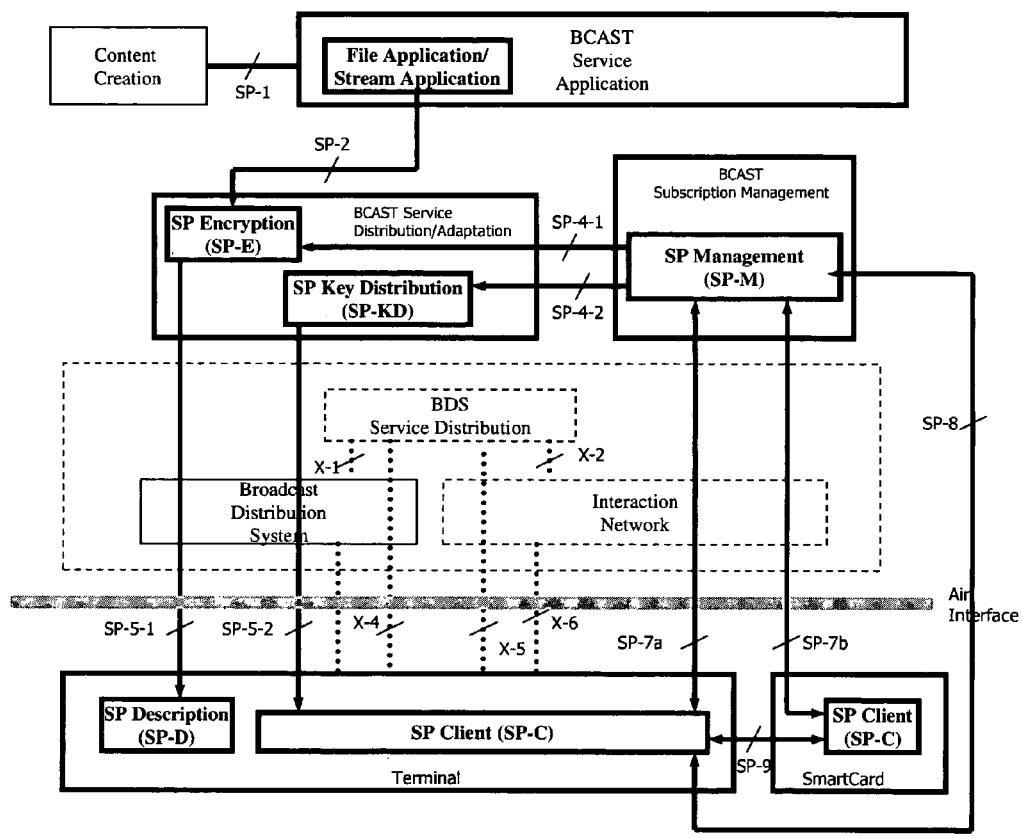
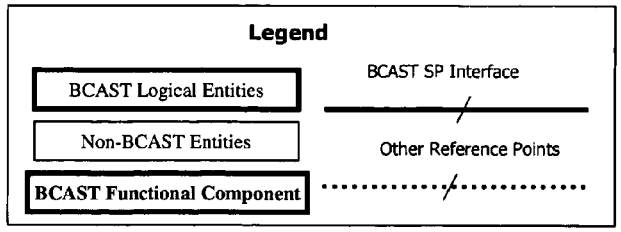

FIG.10

| Interface | Reference Point | Definition |
|---|---|---|
| SP-1 | BCAST-1 | The files and stream from Content Creation is sent to BSD/A. |
| SP-2 | BCAST-2 | The broadcast service (based on file and/or stream distribution) can be<br>– fed into the BDS for unprotected distribution to the terminal<br>– fed into the BDS for protected distribution to the terminal, using native service protection of the BDS<br>– fed into the broadcast service distribution system for OMA-protected distribution to the terminal |
| SP-4-1 | BCAST-4 | This interface delivers TEK for encryption of services from the SP-M to SP-E. |
| SP-4-2 | BCAST-4 | This interface delivers the STKM and LTKM for subscription from the SP-M to the SP-KD. |
| SP-5-1 | BCAST-5 | This interface implements layer 4 ("Content Layer") of the 4-layer model.<br>The OMA-protected service is distributed to the terminal via the BDS.<br>Note: This interface is identical to FD-5 and SD-5. |
| SP-5-2 | BCAST-5 | This interface implements layer 3 ("Short Term Key Delivery Layer") of the 4-layer model. Traffic key messages are distributed to the terminal via the BDS.<br>Another role of this interface is to implement layer 2 ("Long Term Key Delivery Layer") of the 4-layer model for delivery of the long-term key message over the broadcast channel.<br>This interface in conjunction with interface SP-8 also implements layer 1 ("Authentication Layer") of the 4-layer model for registration of terminals over the broadcast channel. The idea is to register "broadcast only terminals" (terminals that don't have an interaction channel) using the broadcast channel for establishing the key material that is required for subsequent transactions.<br>Also the registration of devices that together form a DRM local domain is covered by this interface. |
| SP-7 | BCAST-7 | This interface implements layers 2 and 1 of the 4-layer model for delivery of the long-term key message and registration over the interaction channel. |
| SP-8 | BCAST-8 | This interface provides out-of-band channel for registration over the broadcast channel. |
| SP-9 | N/A | This is the interface between the terminal and the smartcard. This interface is not present for terminals not having a smartcard.<br>NOTE: Further discussion is required to determine if interface SP-9<br>is within the scope of the BCAST enabler.<br>Authentication data and and key material is transmitted over this interface. |

METHOD FOR MANAGING DIGITAL RIGHTS IN BROADCAST/MULTICAST SERVICE

BACKGROUND OF THE INVENTION

1. Field of the Invention

The present invention relates to a digital rights management, and particularly, to a method for managing digital rights in a broadcast/multicast service of a mobile communications terminal.

2. Background of the Related Art

In general, a broadcast/multicast service refers to a service for providing a mobile communications terminal with over-the-air broadcasting or various additional information, or the like. The broadcast/multicast service is a new type of service which includes a broadcast service in which a provider provides useful information to all clients who subscribe to its service, and a multicast service for providing information only to a particular group of clients who have previously subscribed to a particular subject or content.

As the broadcast/multicast service can provide the same information simultaneously to multiple clients, efficient management of network resources allows a high bandwidth application to be provided. Also, since the broadcast/multicast service provides various types of high speed services according to a client's request, the increasing demands and requirements of the clients can be satisfied.

In order to safely protect and systematically manage rights with respect to contents provided by the broadcast/multicast service, service protection and content protection functions are required. Digital rights management (DRM), which is recently being actively discussed, is applied to the broadcast/multicast service to allow protection of the contents provided by the broadcast/multicast service.

The DRM can previously intercept an unauthorized (or illegal) use of contents by converting the contents into a package-type encrypted data using an encryption technique, and thereafter permitting users who have completed an authentication and confirmation procedure for authorization to gain access to the original contents.

Hence, in the method for managing digital rights of the related art broadcast/multicast service, each terminal using the service receives a rights object (RO) for using the service from a rights issuing server (Rights Issuer: RI), and thereafter uses the received RO to decode an encrypted service data or content. Here, the RO may be encrypted by using a public key of each terminal.

That is, the RI should transmit the RO that is encrypted by using the public key of each terminal, to the terminals that use the broadcast/multicast service. For example, if a K number of terminals use the broadcast/multicast service, the RI generates the ROs, each of which is encrypted by using the public key of each of the K number of terminals, and must repeatedly transmit the generated ROs to all the terminals.

However, in the method for managing the digital rights in the broadcast/multicast service, if there are many terminals using the service, the RI must generate/manage the ROs encrypted using the public keys of each terminal one by one, which results in an increased operation load as well as an inefficient network operation and management.

SUMMARY OF THE INVENTION

An important aspect of the present invention is that the present inventors recognized certain drawbacks of the related art, as mentioned above. As a result, the present inventors provided a solution to such drawbacks, as follows.

An object of the present invention is to provide a method for managing digital rights of a broadcast/multicast service capable of efficiently managing digital rights with respect to a group of mobile communications terminals using the same service.

Another object of the present invention is to provide a method for managing digital rights of a broadcast/multicast service capable of efficiently managing digital rights for a mobile communications terminal group using the same service package.

To achieve these and other advantages and in accordance with the purpose of the present invention, as embodied and broadly described herein, there is provided a method for managing digital rights in a broadcast/multicast service for simultaneously providing one or more terminals with the same service data, in which a right issuer (RI) transmits the same rights object (RO) and an encryption key for decoding the RO to terminals using the same service, and the terminals decode an encrypted service data which the terminals have received from a broadcast/multicast server using the transmitted RO and the encryption key.

According to a first aspect of the present invention, a method for managing digital rights in a broadcast/multicast service for simultaneously providing encrypted service data to one or more terminals comprises: receiving, by an RI, a public key from a particular terminal which has requested a service registration; if the RI receives a subscription request for a particular domain from the terminal, transmitting a domain key for the particular domain to the terminal; and transmitting a domain rights object for service data provided to the domain from the RI to the terminal.

According to a second aspect of the present invention, a method for managing digital rights in a broadcast/multicast service comprises: receiving, by an RI, registration request and public key from a particular terminal; if the RI receives a subscription request for a particular service domain from the terminal, transmitting a domain key for the service domain to the terminal; and encrypting a service domain rights object for the service domain using the domain key, by the RI, to then transmit the encrypted service domain rights object to the terminal.

According to a third aspect of the present invention, a method for managing digital rights in a broadcast/multicast service comprises: receiving, by an RI, registration request and public key from a particular terminal; if the RI receives a subscription request with respect to a particular service domain from the particular terminal, encrypting a domain key for the service domain using the public key to then transmit the encrypted domain key to the terminal; encrypting a service domain rights object for the service domain using the domain key, by the RI, to then transmit the encrypted service domain rights object to the terminal; and encrypting a service data encryption key using a key message encryption key contained in the service domain rights object, by the RI, to then transmit the encrypted service data encryption key to the terminal.

According to a fourth aspect of the present invention, a method for managing digital rights in a broadcast/multicast service comprises: receiving, by an RI, registration request and public key from a particular terminal; if the RI receives a subscription request with respect to a particular service bundle from the terminal, transmitting a domain key for the service bundle to the terminal; and encrypting a service bundle rights object for the service bundle using the domain key, by the RI, to then transmit the encrypted service bundle rights object to the terminal.

According to a fifth aspect of the present invention, a method for managing digital rights in a broadcast/multicast service comprises: receiving, by an RI, registration request and public key from a particular terminal; if the RI receives a subscription request with respect to a particular service bundle from the terminal, encrypting a domain key for the service bundle using the public key to then transmit the encrypted domain key to the terminal; encrypting a service bundle rights object for the service bundle using the domain key, by the RI, to then transmit the encrypted service bundle rights object to the terminal; and encrypting a service data encryption key using a key message encryption key contained in the service bundle rights object, by the RI, to then transmit the encrypted service data encryption key to the terminal.

According to a sixth aspect of the present invention, there is provided a method for managing digital rights in a broadcast/multicast service for providing the same service data to one or more terminals, the method comprising: transmitting, by a terminal, a public key thereof to an RI to request a service registration; subscribing to a particular domain, by the terminal, and receiving a domain key for the domain from the RI; obtaining a domain rights object encrypted using the domain key, by the terminal, from the RI; if the terminal receives an encrypted data service, checking whether to have a service data encryption key for decoding the service data; if the terminal is checked to have the service data encryption key therein, detecting the service data encryption key to thus decode the service data.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 9 shows exemplary service protection function blocks and interfaces between them according to the present invention.

FIG. 10 shows a table that explains the interfaces and maps them to BCAST reference points according to the present invention.

DETAILED DESCRIPTION OF THE PREFERRED EMBODIMENTS

Figure 1:
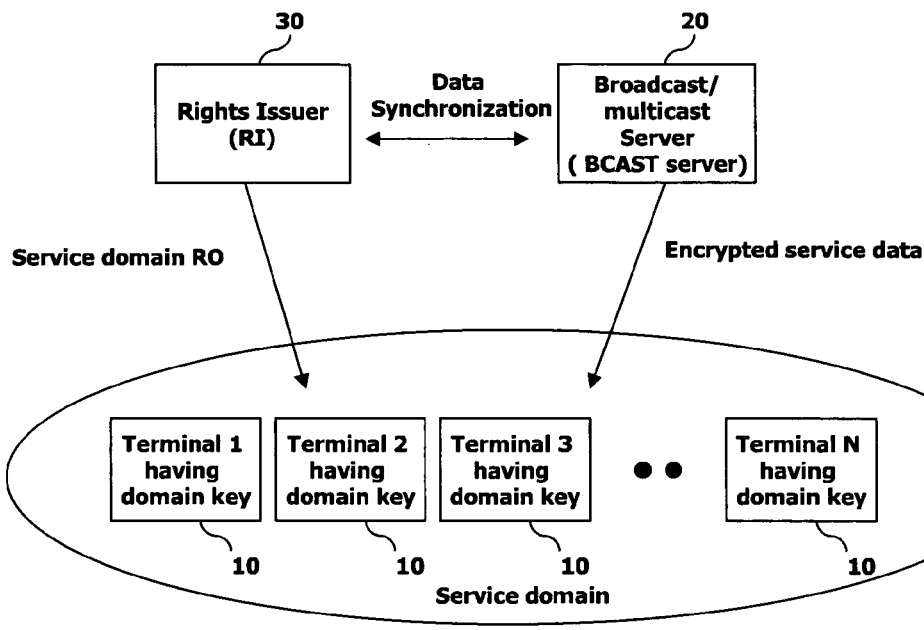
FIG. 1 is a block diagram illustrating a construction of a broadcast/multicast service system according to the present invention.

Embodiments of an exemplary method for managing digital rights in a broadcast/multicast service according to the present invention will now be explained with reference to the attached drawings.

In general, in digital rights management, in order to share a contents rights object and a contents encryption key, various devices (including a terminal) use a concept referred to as a domain.

The use of a domain allows contents and contents rights objects to be shared among various devices owned by one user, and a device which is not permitted to access a contents issuer or a rights issuer could use an access-permissible device to obtain the contents and contents rights objects. For example, a portable music playback device which does not have wireless Internet capabilities can be connected to a personal computer (PC) that allows Internet access to thus obtain contents and contents rights objects. Therefore, the rights issuer manages the domain to process joining requests and leaving requests of the device belonging to the domain.

The present invention may provide a certain type of broadcast domain. All terminals that subscribe to a service or a service bundle share a common group key. Service Encryption Keys (SEK) or Program Encryption Keys (PEK) then would be encrypted using this common group key. This type of broadcast domain is called a service domain. Namely, a set (or group) of terminals that subscribe to a service or service bundle, and share a common encrypted key is referred to as a service domain. Here, a selectively combined set (or group) of one or more services is referred to as a service bundle.

The service domain is a broadcast domain which is a collection of terminals that subscribe to a service or a service bundle having multiple services. Terminals in the service domains share a common group key which may be called as a service domain key. One or more service encryption keys (SEK) or Program encryption keys (PEK) then would be encrypted using this service domain key.

Terminals in a service domain are allowed to share the same contents and the same services with at least one other device within the service domain, subject to permissions specified by content or service providers. The advantage of service domains is that communicating changes in SEK or PEK consumes very little bandwidth.

For service domain join/leave operations, it almost follows the current 4-layer key hierarchy model in the OMA BCAST AD, but only the definition of Layer 1 is extended to include terminal registration and domain management.

A service domain is a mechanism to implement subscriber group management and another one is Domain Management which is defined in certain portions of the OMA standard (e.g. OMA-TS-DRM-XBS).

Terminals in a service domain can share contents and services with any other terminal within the same service domain, subject to permissions specified by the contents or service providers. The advantage of service domains is that communicating changes in SEK consumes very little bandwidth.

In the present invention, the RI transmits to the terminals, a key message with respect to a service domain which is a group of terminals using the same service or service bundle.

Here, the key message refers to a means of providing information about the rights to use the service domain (upon joining) that is sent from the Rights Issuer (RI) to the terminal (device). One non-limiting example can be a service domain rights object (i.e., Rights Object: RO). Hereafter, the present invention will simply refer to a "rights object" merely for the sake of convenience. It is clear that other types of key messages or other informing means may also be employed.

Each terminal having received the domain rights object (RO), decodes the domain RO corresponding to the domain thereof by using a domain key belonging thereto. Here, the RI issues a number of rights objects that equal the number of service domains regardless of the number of terminals using the service or service bundle. The terminals belonging to the same domain share the same domain key with each other.

In the present invention, the RI receives a public key from a terminal requesting a service registration, encrypts a domain key corresponding to a domain that the terminal intends to use, using the public key to then transmit the encrypted domain key. The RI then transmits the domain rights object (RO) encrypted by using the domain key. Here, the domain RO contains a service data encryption key for decoding the encrypted service data received from a broadcast/multicast server.

In the present invention, the RI receives a public key from a terminal which requests a service registration. The RI then encrypts a domain key corresponding to the domain, which the terminal wants to use, using the public key. The RI then transmits the encrypted domain key to the terminal. Also, the RI encrypts a domain RO containing a key message encryption key using the domain key to then transmit the encrypted domain RO to the terminal. The RI also encrypts a service data encryption key for decoding service data received from a broadcast/multicast server using the key message encryption key to then transmit the encrypted service data encryption key to the terminal.

FIG. 1 is a block diagram illustrating an exemplary construction of a broadcast/multicast service system according to the present invention. The broadcast/multicast service system can roughly comprise terminals 10, a broadcast/multicast (BCAST) server 20 for providing a service to the terminals 10, and a rights issuer (RI) 30 for managing a rights object (RO) to thus allow the terminals 10 to use the service.

Here, the RI 30 may transmit the RO to the terminals 10, or the BCAST server 20 may receive the RO from the RI 30 to then transmit the received RO to the terminals 10.

The present invention may divide the terminals according to the service or service bundle that is used. The service bundle is constructed as one package by combining one or more services (contents) which are not related to one another. Here, a set (or group) of terminals that subscribe to a service or service bundle, and share a common encrypted key is referred to as a service domain. Also, a selectively combined set (or group) of one or more services is referred to as a service bundle. Here, one terminal may belong to one or more service domains.

Figure 2:
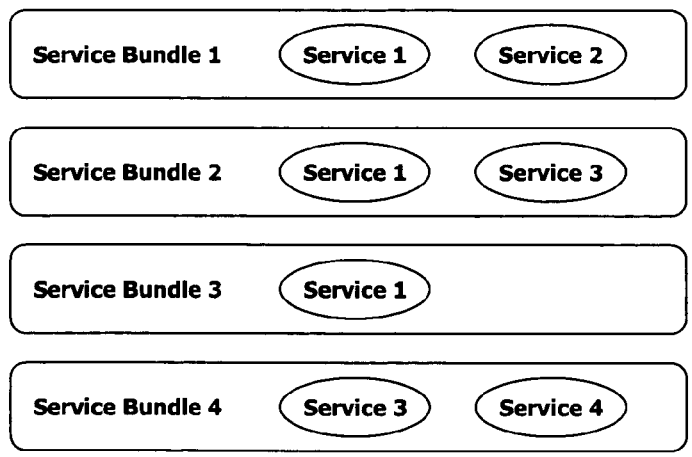
FIG. 2 is an exemplary view illustrating examples of service bundles.

FIG. 2 is exemplary view illustrating a concept of service bundles.

Referring to FIG. 2, it is assumed that a service bundle 1 is a package containing a service 1 and a service 2, a service bundle 2 is a package containing the service 1 and a service 3, a service bundle 3 contains the service 1, and a service bundle 4 is a package containing the service 3 and a service 4. A terminal subscribing to the service bundle 1 can use the services 1 and 2, and a terminal subscribing to the service bundle 4 can use the services 3 and 4. It should be noted that a group of multiple terminals may use one or more services within a service bundle.

Hence, the RI 30 does not issue the RO with respect to each terminal 10, but issues the RO with respect to a service domain to which the terminal 10 belongs. That is, the domain RO that the terminals 10 belonging to the same service domain receive from the RI 30 is the same. The domain RO is encrypted using the domain key corresponding to each domain, and accordingly the terminals belonging to the same domain can share the domain key for decoding the RO.

Figure 3:
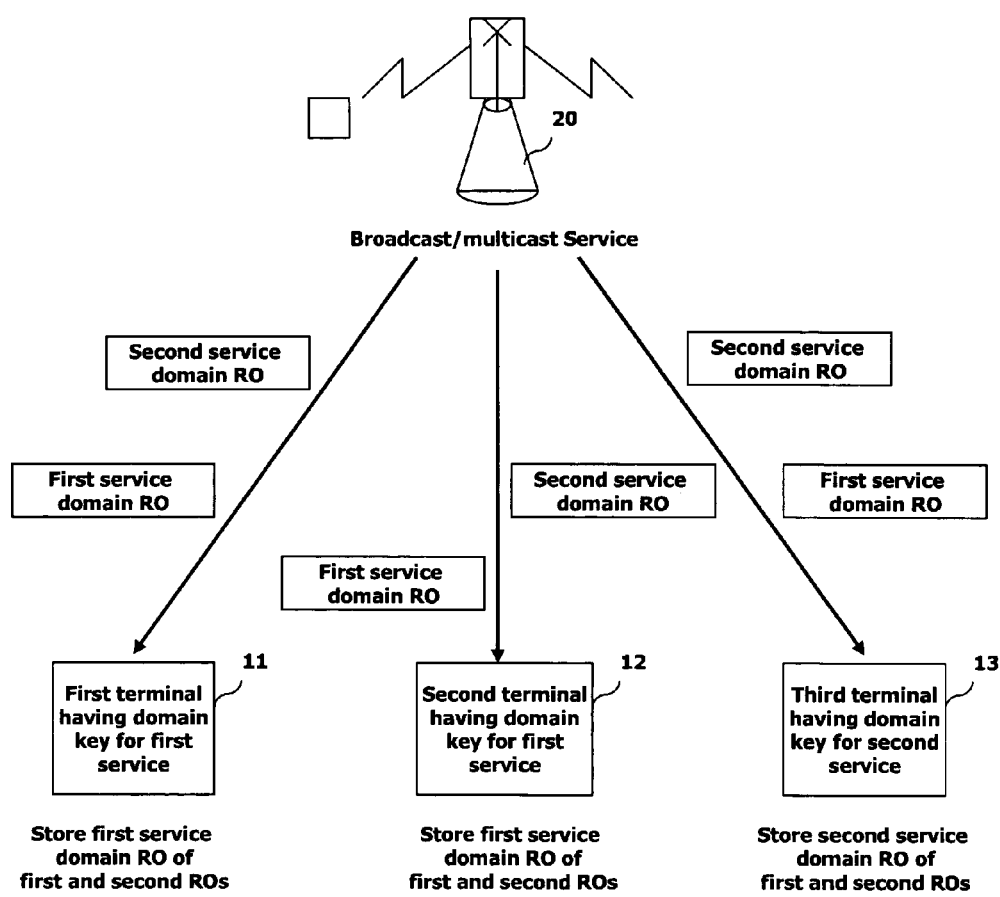
FIG. 3 is an exemplary view illustrating an exemplary operation scheme based upon service domains according to the present invention

FIG. 3 illustrates an exemplary operation scheme based upon service domains according to the present invention. Here, a first terminal 11 and a second terminal 12 subscribed to a first service bundle, and a third terminal 13 subscribed to a second service bundle.

First, the first terminal 11 and the second terminal 12 receive a domain key for the first service domain from the RI (not shown) to thus have the domain key, and the third terminal 13 receives and has a domain key for the second service domain.

The RI or broadcast/multicast server 20 may transmit a service domain RO to each terminal 11, 12 and 13. FIG. 3 shows an example where the broadcast/multicast server 20 receives the RO of each service domain from the RI (not shown) to then transmit the received RO to each terminal 11, 12 and 13.

Each terminal 11, 12 and 13 having received the domain RO, then decodes the domain RO by using the domain key that each terminal 11, 12 and 13 has. That is, among the two domain ROs that were received, the first terminal 11 and the second terminal 12 can decode the first service domain RO, while the third terminal 13 can decode the second service domain RO.

As aforementioned, in the present invention, the RI or the broadcast/multicast server issues a certain number of domain ROs that equal the number of the service domains regardless of the number of terminals using the service, and each terminal decodes only the domain RO it can decode using its domain key of the domain ROs. Therefore, the service system according to the present invention can maintain security for a service (content), and efficiently use a network between the server and the terminal at the same time.

Figure 4:
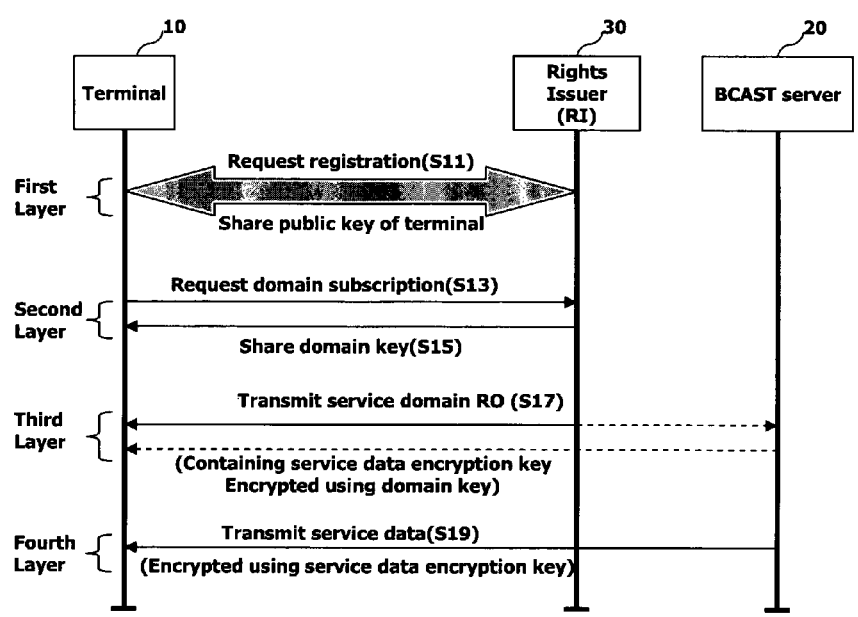
FIG. 4 is a signal flowchart illustrating a first embodiment for a method for managing digital rights according to the present invention.

FIG. 4 is a signal flowchart illustrating a first embodiment of an exemplary method for managing digital rights (copyrights) according to the present invention. Particularly, FIG. 4 illustrates a process for receiving a domain RO and service data by a terminal with reference to a layered structure of security keys.

As illustrated in FIG. 4, a first layer is used to allow service registration to be performed between the terminal 10 and the RI 30 (S11). It should be noted that such device registration may be performed in an off-line manner or an on-line manner. Examples of the on-line manner includes the use of a broadcast or interaction channel.

A public key of the terminal 10 may be transmitted to the RI 30 through the first layer, and a security algorithm which would be used between the terminal 10 and the RI 30 is negotiated. Here, an RI context may be generated in the terminal 10. The RI context may contain information negotiated when the terminal 10 registers with the RI 30, particularly, an RI ID, a certificate of the RI, a version, security algorithm, and other information.

A second layer, which is used as a domain management layer, is used to subscribe and leave (terminate) a particular service domain. Here, before using the second layer, the terminal 10 may receive a service guide containing information (service information, domain information, or the like) for describing broadcast/multicast services that the terminal 10 can use.

After confirming the services which can be used in the terminal 10 through the service guide, the user requests a domain subscription from the RI 30 using the terminal 10 (S13), the RI 30 transmits a domain key encrypted by using the public key to the terminal 10 (S15). When requesting the domain subscription, the terminal 10 transmits a service ID or service bundle ID, a terminal ID, a terminal digital signature, and the like, as parameter types.

As a result of the domain subscription, a domain context is generated in the terminal 10. The domain context contains information related to the domain key, a domain ID, a domain validity, and the like.

When the terminal requests a domain leaving (termination) from the RI 30, the RI 30 deletes the corresponding terminal 10 from a list of terminals belonging to the domain, and the terminal 10 deletes (terminates) its relationship with the domain.

A third layer is used as an RO management layer. The RI 30 uses the third layer to transmit the service domain RO to the terminal 10 (S17). Here, the domain RO contains one or more service data encryption keys (e.g., SEK: Service Encryption Key) that is/are encrypted by using the domain key.

The RI 30 can directly transmit the service domain RO to the terminal 10, or can transmit such to the terminal 10 via the broadcast/multicast server 20. That is, the RI 30 transfers the service domain RO to the broadcast/multicast server 20, and the broadcast/multicast server 20 having received the RO transmits the corresponding RO to the terminal 10. Here, the RO transmitted from the RI 30 can be transferred to the terminal 10 via the broadcast/multicast server 20. Transmitting the RO directly to the terminal 10 or via the broadcast/multicast server 20 can be selectively used as needed. If the RI 30 can be provided with the necessary functions performed by the broadcast/multicast server 20, then the RI 30 can directly transmit the RO to the terminal 10.

A fourth layer is used as a service encryption layer. The broadcast/multicast server 20 transmits service data encrypted using the service data encryption key to the terminal 10 through the fourth layer (S19). The terminal 10 receives the RO with respect to a particular service domain and the service data encrypted using the particular service data encryption key, and decodes the service data using the RO. A method for decoding the service data by the terminal will be explained later.

Accordingly, since the service data encryption key for decoding the service data has been encrypted by using the domain key, a terminal having the same domain key can obtain the service data encryption key to thus execute the service data.

Figure 5:
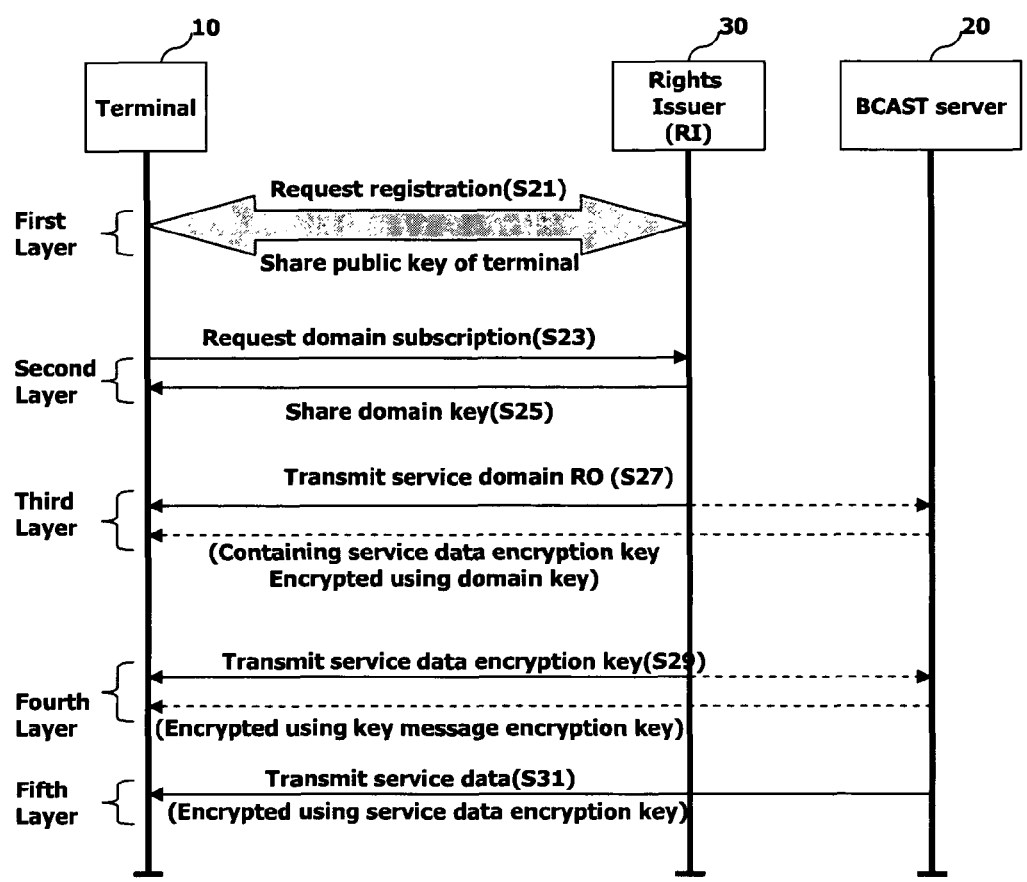
FIG. 5 is a signal flowchart illustrating a second embodiment for a method for managing digital rights according to the present invention.

FIG. 5 is a signal flowchart illustrating a second embodiment for an exemplary method for managing digital rights according to the present invention. The process for receiving a domain RO and service data by the terminal is depicted with reference to a layered structure of security keys.

In particular, in the second embodiment of the present invention, a key message encryption key (e.g., TEK: Traffic Encryption Key) for inducing the service data encryption key is used in addition to the one or more service data encryption keys (e.g., SEK: Service Encryption Key) of the first embodiment to provide additional protection and security for the service data.

Accordingly, in addition to sharing a public key (PK), there is a particular relationship regarding certain security keys (i.e., domain key, SEK, TEK) used by the device (terminal) and the rights issuer (RI). Namely, the domain key is used for encryption and decryption of a rights object (RO) that contains one or more SEKs, the SEK is used for TEK encryption and decryption, while the TEK is used for contents encryption and decryption.

As illustrated in FIG. 5, first, when the terminal 10 requests registration to the RI 30 at the first layer (S21), a security algorithm to be used between the terminal 10 and the RI 30 is negotiated. It should be noted that such device registration may be performed in an off-line manner or an on-line manner. Examples of the on-line manner includes the use of a broadcast or interaction channel.

As a result of the registration request, an RI context is generated in the terminal 10. The RI context contains information related to an RI ID, a certificate of the RI, a version, a security algorithm, and other information.

Before executing an operation at the second layer, the terminal 10 may receive a service guide with respect to broadcast/multicast services which can be used thereby.

At a second layer, the terminal 10 requests a subscription with the service domain for providing a particular service or service bundle from the RI 30 (S23). The RI 30 transmits to the terminal 10, the domain key that is encrypted by using the public key of the terminal 10 (S25). When requesting the domain subscription, the terminal 10 transmits the service ID or service bundle ID, a terminal ID, a terminal digital signature, and the like, to the RI 30.

Therefore, a domain context is generated in the terminal 10 which has received the domain key from the RI 30. The domain context contains information related to the domain key, a domain ID, a domain validity, and the like. When the terminal 10 requests a subscription to one or more service domains, the number of domain keys and domain IDs that the terminal 10 can have would be equal to the number of domains.

A third layer is used as an RO management layer. The RI 30 transmits the service domain RO to the terminal 10 through the third layer (S27). Here, since the domain RO contains one or more service data encryption keys (e.g., SEK: Service Encryption Key) that is/are encrypted by using the domain key, only the terminals belonging to the service domain which has the domain key can decode the service data encryption key.

As in the first embodiment, the RI 30 can directly transmit the RO to the terminal 10, or can transmit such to the terminal 10 via the broadcast/multicast server 20. If the RI 30 is provided with the necessary capabilities of the broadcast/multicast server 20, then the RO may be directly transmitted to the terminal 10.

A fourth layer is used as a key transmission layer. The RI 30 transmits the service data encryption key (e.g., TEK: Traffic Encryption Key) that was encrypted by using the key message encryption key to the terminal 10 through the fourth layer. Accordingly, only those terminals having the key message encryption key can decode the service data encryption key.

The service data encryption key may be transmitted to the terminal 10 through the broadcast/multicast server 20 as well as through the RI 30. Here, the RI 30 transmits the service data encryption key to the broadcast/multicast server 20, which then transmits the corresponding service data encryption key to the terminal 10. If the RI 30 is provided with the necessary capabilities of the broadcast/multicast server 20, then the TEK may be directly transmitted to the terminal 10.

A fifth layer is used as a service encryption layer. The broadcast/multicast server 20 transmits service data encrypted using the service data encryption key to the terminal 10 through the fifth layer (S31).

The layered structure of security keys according to the present invention may have other configurations that are different from those shown in the first and second embodiments for the service domain.

Figure 6:
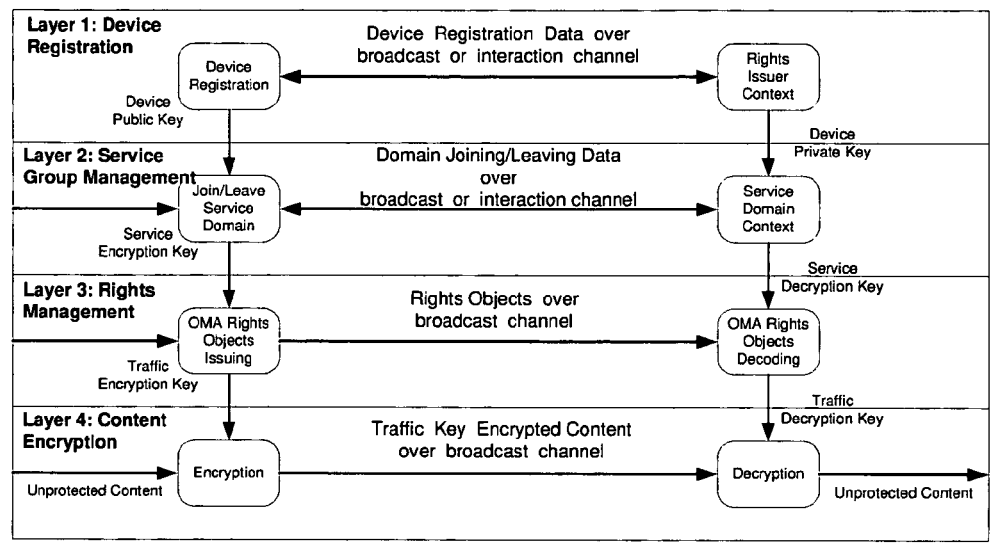
FIG. 6 depicts a key hierarchy for service protection according to the present invention.

The present invention may be further understood by referring to FIG. 6, which depicts a key hierarchy for service protection according to the present invention. Namely, FIG. 6 presents the key hierarchy for service protection with the domain according to the present invention.

Layer 1 implements device (terminal) registration. The key material and meta data acquired during the registration phase will enable the device to decrypt and authenticate rights objects and subsequently access contents.

FIG. 6 shows a situation where the device registers it's public key with the rights issuer (RI) through device registration and the rights issuer encrypts the Service Encryption Key (SEK) by using a device public key. Here, not only the device but also another domain can also register with the rights issuer. To do so, the domain may register a 'public key of devices in the domain' or a 'domain key' with the rights issuer.

Layer 2 implements a Service Group Management function. The OMA DRM Join/Leave Domain Protocol may be used for devices that have access to an interaction channel. This layer delivers a Service Encryption Key (SEK) as a domain key. The Service Encryption Key (SEK) may be updated through the creation of a new domain or through a domain upgrade.

Layer 3 implements a rights management function. A Rights Object (RO), which can be protected by a service key (e.g., SEK), contains the traffic key (e.g., TEK) which is needed to decrypt (a part of) the service, together with the identifiers that allow the traffic key to be linked with the encrypted contents and the domain. The crypto-period (i.e., life-time) of the traffic key may be relatively short in order to prevent real-time distribution attacks.

The idea behind layer 3 is to provide enhanced security, scalability and richer use-case support. The specification for layer 3 should ensure that these requirements are met.

It should be noted that the architectural framework does not exclude solutions that include changing security elements, such as key derivation.

Since the execution of Layer 2 can be disturbed by unexpected conditions, Layer 3 should be implemented to be executed after a reasonable time delay from the starting of Layer 2 procedures.

Layer 4 implements encryption of the broadcast content with the traffic key. The encryption can be performed on network layer (i.e. IP), transport layer (e.g. UDP), or session layer (e.g. RTP).

The present invention can be further understood by referring to FIGS. 7 through 10 and the following description.

Figure 7:
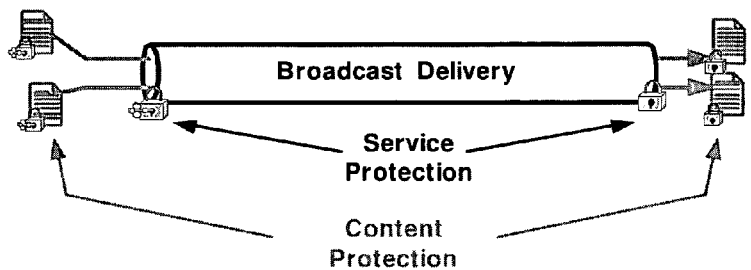
FIG. 7 illustrates the difference between Service Protection and Content Protection according to the present invention.

The Service and Content Protection functions enable a BDS-agnostic way of protecting both content and services delivered within Mobile Broadcast services. FIG. 7 illustrates the difference between Service Protection and Content Protection.

Service protection has the purpose of allowing access to a service, i.e. for a defined set of (audio-visual) data for a specified amount of time. Service protection assumes no responsibility for content after have been released to the user terminal; it does not provide any technical means to protect content outside of the bit-pipe that is implementing access control.

Content protection has the purpose of securing the individual pieces of content. Content may or may not have post-delivery usage rights associated with it.

Service Protection, independent from Content Protection, is intended for subscription management. In the absence of content protection, usage rights to content in general may be free, or subject to applicable legislation, business model or other requirements; however such considerations are beyond the scope of these definitions. Content Protection deals with post-delivery usage rights which specifies how contents can be used according to permissions and constraints.

Figure 8:
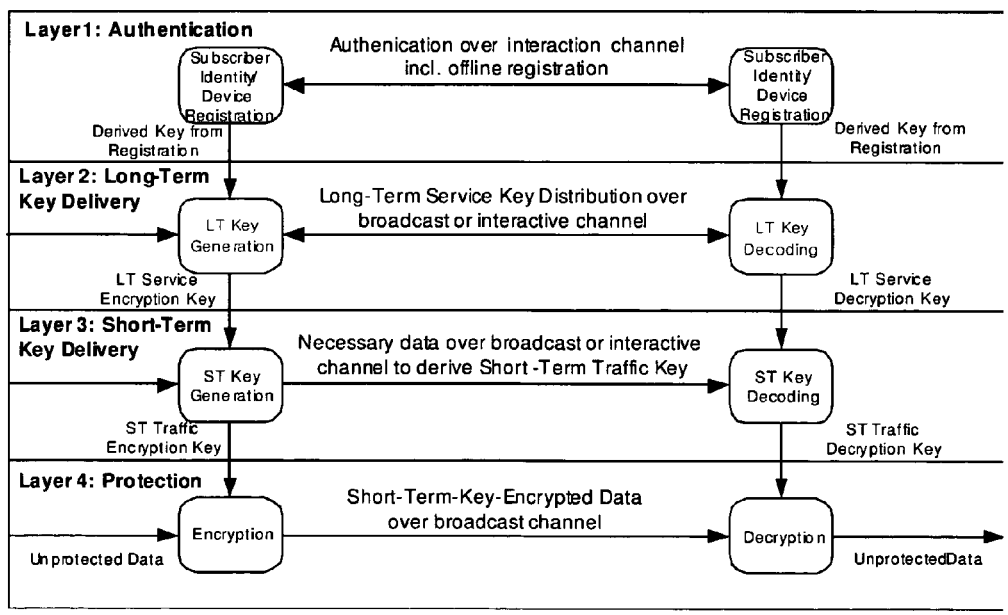
FIG. 8 presents an exemplary key hierarchy for service protection and content protection according to the present invention.

FIG. 8 presents the key hierarchy for service protection and content protection.

Layer 1 implements Authentication. The key material and meta-data acquired during the subscriber identity (SI) or device registration phase will enable the subscriber or device to be authenticated and subsequently access content, and are securely stored within the terminal or in an integrated circuit card (e.g., a smart card). Here, the smart card can be USIM/(R-)UIM. The key material obtained in Layer 1, and used to protect the Long Term Key delivery in Layer 2, is referred to as the Subscriber Management Key or Rights Encryption Key.

Layer 2 implements Long-Term Key Message (LTKM) delivery. This layer delivers a service encryption key (SEK) or program encryption key (PEK). The service or program encryption key is an intermediate key, i.e. it does not directly encrypt the content but instead protects a sequence of traffic encryption keys (TEKs). For management and protection of service subscriptions the SEK or PEK will be updated with normally longer crypto-period than the TEK traffic key.

Layer 3 implements Short-Term Key Message delivery over the broadcast or interactive channel. A TEK, encrypted by a SEK or PEK, or necessary data that can be used for deriving the traffic key, is sent to the terminal, together with the identifiers that allow the traffic key to be linked with the encrypted content.

The idea behind layer 3 is to provide enhanced security, scalability and richer use-case support. The specification for layer 3 shall ensure these ideas are met.

Layer 4, or Protection, implements broadcast content encryption with the Short-Term traffic key. The encryption can be performed on network layer (i.e. IP), transport layer (e.g. UDP), session layer (e.g. RTP) or content layer (AU encryption) for the service protection.

FIG. 9 shows service protection function blocks and interfaces between them. As the features shown in FIG. 9 would be understood by those skilled in the art, a detailed explanation is being omitted merely for the sake of brevity.

FIG. 10 shows a table that explains the interfaces and maps them to BCAST reference points:

File Application/Stream Application Function

The File Application/Stream Application Function (FA/SA) in the BSA is responsible for receiving files and stream from Content Creation and sending the file and stream with attributes and additional information to BCAST Service Distribution/Adaptation.

SP Management Function

The Service Protection Management Function (SP-M) in the BSM is responsible for registration, the LTKM delivery over interaction channel. The long-term key message containing the SEK is delivered to the SP-C from the SP-M. Broadcast-only terminals require out-of-band channel to initiate the request for registration and the long-term key message delivery and broadcast-only terminals receive responses for the registration and the long-term key message delivery over broadcast channel.

The SP-M also handles the STKM delivery and the secure group management. The STKM, delivered from the SP-M to the SP-KD, is distributed to the SP-C over the broadcast channel. The secure group management scheme can be used for efficient broadcasting of the long-term key message and revocation procedure. The SP-M is in charge of the domain management. The terminal can join a domain or leave a domain using the SP-M.

SP Key Distribution Function

The Service Protection Key Distribution Function (SP-KD) in the BSD/A is responsible for broadcasting LTKM and STKM. The Terminal can acquire the TEK from STKM for decryption of the encrypted services. The STKM, LTKM and registration key materials are sent from the SP-M to the SP-KD for distribution to the Terminals. The SP-KD also transfers the STKM, LTKM and key materials over broadcast channel for broadcast-only terminals.

SP Encryption Function

The Service Protection Encryption Function (SP-E) in the BSD/A is responsible for encrypting services for delivery over the broadcast channel. The TEK, delivered from the SP-M, is used for encrypting services. The format of the encrypted service depends on the specific service protection system.

SP Decryption Function

The Service Protection Decryption Function (SP-D) in the Terminal is responsible for decrypting the encrypted services using the TEK extracted from the STKM. The STKM is delivered from the SP-M to the SP-KD and the SP-C receives the STKM from the SP-KD over broadcast channel.

SP Client Function

The Service Protection Client Function (SP-C) is either in the Terminal only or in both the Terminal and the Smartcard. The SP-C is responsible for registration and acquisition of the LTKM and the STKM. After the registration, the SP-C acquires the REK, SMK or GMK which is derived from the registration. The LTKM contains the SEK which is used for encrypting the STKM. The SP-C also acquires TEK by decrypting STKM using SEK and the TEK is sent to the SP-D for decryption of the encrypted services.

The present invention provides a broadcast-multicast service method comprising: receiving a request from a terminal to join a service domain having a common group key; transmitting encryption of one or more security encryption keys using the common group key to the terminal that requested to join; and allowing the terminal to share the same contents and the same services with one or more other devices within the service domain.

The allowing step may further comprise: transmitting a rights object which includes one or more service encryption keys, wherein each rights object is encrypted by using the common group key. The service domain may include at least one service or a service bundle that includes multiple services. Each service may include a service encryption key. Each service encryption key is used to encrypt one or more traffic encryption keys. The traffic encryption key is used to encrypt service data of the same contents and the same services.

Also, the present invention provides a method of digital rights management for a broadcast-multicast service, the method comprising: receiving a request from a terminal to join a service domain that shares a common group key; and sending to the terminal that joined the service domain, a key message having one or more service encryption keys encrypted by using the common group key, such that the terminal is allowed to share the same contents and the same services with at least one other device within the service domain.

The key message may be a rights object. The service domain may include at least one service or a service bundle having multiple services. Each service may include a service encryption key. Each service encryption key is used to encrypt one or more traffic encryption keys. The traffic encryption key is used to encrypt the service data or contents.

Additionally, the present invention provides a method of digital rights management for a broadcast-multicast service, the method comprising: receiving a common group key upon joining a service domain; receiving a rights object which includes one or more service encryption keys, wherein each rights object is encrypted by using the common group key; and receiving service data and decrypting the received service data using the received rights object.

The service domain includes at least one service or a service bundle that includes multiple services. Each service may include a service encryption key. Each service encryption key is used to encrypt one or more traffic encryption keys. The traffic encryption key is used to encrypt the service data or contents.

Furthermore, the present invention provides a method of digital rights management for a broadcast-multicast service, the method comprising: negotiating a registration procedure between a device and a rights issuing server; performing a service domain joining procedure between the device and the rights issuing server based upon the negotiated registration procedure, to allow the device to share a domain key associated with all devices that have joined the service domain; providing the device with rights to use the service domain by including one or more service data encryption keys that have been encrypted by using the domain key; and allowing the device to access contents of service data sent from the rights issuing server by permitting decryption of the service data by using the service data encryption keys and the domain key.

The providing step further comprising: sending a service data encryption key from the rights issuing server to the device, the service data encryption key having been encrypted by using a key message encryption key.

The present invention provides a system digital rights management for a broadcast-multicast service, the system comprising: a contents provider server adapted to provide contents of the broadcast-multicast service; a device adapted to receive the contents of the broadcast-multicast service after joining a service domain that shares a domain key associated with all devices that have joined the service domain; and a rights issuer server adapted to cooperate with the contents provider server and the device to allow the device to join the service domain and appropriately decrypt the contents provided from the contents provider by using service encryption keys and traffic encryption keys.

The service data encryption keys may be transmitted from the rights issuer server to the device via a broadcast-multicast server.

The present invention provides a method of digital rights management for a broadcast-multicast service, the method comprising: performing a service domain joining procedure between a device and a rights issuer based upon a negotiated registration procedure, to allow the device to share a domain key; sending at least one rights object from the rights issuer to the device, the rights object being encrypted by using the domain key and containing at least one service encryption key; using a content of the broadcast-multicast service at the device upon performing decryption by using a traffic encryption key that was encrypted by using the service encryption key.

The present invention provides a terminal supporting digital rights management for a broadcast-multicast service, the terminal comprising: a transceiver adapted to send and receive signals and information; and a processor cooperating with the transceiver and adapted to perform the steps of, receiving a request from a terminal to join a service domain having a common group key; transmitting encryption of one or more service encryption keys using the common group key to the terminal that requested to join to allow sharing of the same contents and the same services with one or more other devices within the service domain.

The present invention provides a terminal supporting digital rights management for a broadcast-multicast service, the terminal comprising: a transceiver adapted to send and receive signals and information with a network; and a processor cooperating with the transceiver and adapted to perform the steps of, sending a request to the network to join a service domain that shares a common group key; and receiving a key message having one or more service encryption keys encrypted at the network by using the common group key, to allow sharing of the same contents and the same services with at least one other device within the service domain.

The present invention provides a terminal supporting digital rights management for a broadcast-multicast service, the terminal comprising: a transceiver adapted to send and receive signals and information with a network; and a processor cooperating with the transceiver and adapted to perform the steps of, receiving a common group key upon joining a service domain; receiving a rights object which includes one or more service encryption keys, wherein each rights object is encrypted by using the common group key; and receiving service data and decrypting the received service data using the received rights object.

The present invention provides a terminal supporting digital rights management for a broadcast-multicast service, the terminal comprising: a transceiver adapted to send and receive signals and information with a network; and a processor cooperating with the transceiver and adapted to perform the steps of, negotiating a registration procedure with a rights issuing server of the network; performing a service domain joining procedure with the rights issuing server based upon the negotiated registration procedure, to allow sharing of a domain key associated with all devices that have joined the service domain; receiving rights to use the service domain including one or more service data encryption keys that have been encrypted by the rights issuing server using the domain key; and accessing contents of service data sent from the rights issuing server by performing decryption of the service data by using the service data encryption keys and the domain key.

The present invention provides a terminal supporting digital rights management for a broadcast-multicast service, the terminal comprising: a transceiver adapted to send and receive signals and information with a network having a rights issuer server and a contents provider server; and a processor cooperating with the transceiver and adapted to perform the steps of, receiving the contents of the broadcast-multicast service after joining a service domain that shares a domain key associated with all devices that have joined the service domain; and cooperating with the rights issuer server and the contents provider server to allow joining of the service domain; and appropriately decrypting the contents provided from the contents provider by using service encryption keys and traffic encryption keys.

The present invention provides a terminal supporting digital rights management for a broadcast-multicast service, the terminal comprising: a transceiver adapted to send and receive signals and information with a network; and a processor cooperating with the transceiver and adapted to perform the steps of, performing a service domain joining procedure with a rights issuer based upon a negotiated registration procedure, to allow sharing of a domain key; receiving at least one rights object from the rights issuer, the rights object having been encrypted by the rights issuer using the domain key and containing at least one service encryption key; and using a content of the broadcast-multicast service upon performing decryption by using a traffic encryption key that was encrypted by using the service encryption key.

To implement the various features described above, the present invention can employ various types of hardware and/or software components (modules). For example, different hardware modules may contain various circuits and components necessary to perform the steps of the above method. Also, different software modules (executed by processors and/or other hardware) may contain various codes and protocols necessary to perform the steps of the present invention method.

As described above, in the method for managing digital rights in the broadcast/multicast service according to the present invention, the RI issues one domain RO for every service domain regardless of the number of terminals taking part in the service, so as to enable a decrease in a load of the RI.

Also, in the method for managing digital rights in the broadcast/multicast service according to the present invention, the RO is issued according to a domain unit, and thus every terminals using the service can receive the RI in a shorter time and a network can be used very efficiently.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of digital rights management for a broadcast-multicast service, the method performed by a terminal and comprising:

performing a registration procedure with a network, a public key of the terminal being shared during the registration procedure performed via a broadcast channel or interaction channel;

sending, to the network, a request message to join a service domain that corresponds to a service bundle comprising a plurality of services which share a common domain key;

receiving, from the network, the common domain key for the service bundle, the common domain key having been encrypted by using the public key;

receiving, from the network, a service domain RO (Rights Object) including a plurality of Service Encryption Keys (SEKs), each SEK being encrypted by the received common domain key, and the service domain RO being broadcast via the broadcast channel or directly transmitted via the interaction channel to a plurality of terminals that joined the service domain;

receiving, from the network, a Traffic Encryption Key (TEK) being encrypted by using one of the plurality of SEKs, the TEK being broadcast via the broadcast channel or directly transmitted via the interaction channel; and receiving, from the network, service data of the broadcast-multicast service, the service data being encrypted by using the TEK.

2. The method of claim 1, further comprising: decrypting the received service data by using the TEK.

3. The method of claim 1, wherein the common domain key and the service domain RO are received from a Rights Issuer (RI) of the network.

4. The method of claim 3, wherein the request message is a domain subscription request message used to request subscription with a service domain for providing a particular service or service bundle from the RI.

5. The method of claim 4, wherein when requesting subscription with the service domain, at least one of a service ID or service bundle ID, a terminal ID, and a terminal design signature is sent to the RI.

6. A method of digital rights management for a broadcast-multicast service, the method performed by a network and comprising:

performing a registration procedure with a terminal, a public key of the terminal being shared during the registration procedure performed via a broadcast channel or interaction channel;

receiving, from the terminal, a request message to join a service domain that corresponds to a service bundle comprising a plurality of services which share a common domain key;

sending, to the terminal, the common domain key for the service bundle, the common domain key that was encrypted by using the public key;

sending, to the terminal, a service domain RO (Rights Object) including a plurality of Service Encryption Keys (SEKs), each SEK being encrypted by the sent common domain key, and the service domain RO being broadcast via the broadcast channel or directly transmitted via the interaction channel to a plurality of terminals that joined the service domain;

sending, to the terminal, a TEK (Traffic Encryption Key) being encrypted by using one of the plurality of SEKs, the TEK being broadcast via the broadcast channel or directly transmitted via the interaction channel; and sending, to the terminal, service data of the broadcast-multicast service, the service data being encrypted by using the TEK.

7. The method of claim 6, wherein the common domain key and the service domain RO are sent from a Rights Issuer (RI) of the network.

8. The method of claim 7, wherein the request message is a domain subscription request message used to request subscription with a service domain for providing a particular service or service bundle from the RI.

9. The method of claim 8, wherein when requesting subscription with the service domain, at least one of a service ID or service bundle ID, a terminal ID, and a terminal design signature is received by the RI.

10. The method of claim 6, wherein the TEK is sent to the terminal by a BCAST server of the network.

* * * * *